Patented Mar. 1, 1938

2,109,772

UNITED STATES PATENT OFFICE 2,109,772

THICKENED LUBRICATING OIL

Per K. Frolich, Roselle, N. J., assignor to Standard Oil Development Company, a corporation of Delaware No Drawing. Application October 21, 1933, Serial No. 694,616

5 Claims. (Cl. 196—151)

This invention relates to improved lubricating compositions comprising solutions of synthetic resinous bodies in lubricating oils and relates more particularly to the improvement of the viscosity and viscosity index of inferior quality lubricating oils by addition thereto of resins prepared by polymerization and/or condensation of olefines and diolefines or mixtures thereof such as are found in cracked naphthas.

A class of hydrocarbon resins of varying melting point, friability and color, and which are soluble in benzol and gasoline and are insoluble in ethyl alcohol and acetone is obtained by the polymerization and condensation of cracked naphthas or of the unsaturated components thereof by the application of heat and pressure or by action of suitable polymerizing agents such as the active halides, for example aluminum chloride, zinc chloride, boron fluoride, and the like. It has now been found that these resins are soluble in lubricating oils, particularly those derived from asphaltic or naphthenic base crudes, and that the resulting solutions have a materially higher viscosity and viscosity index than the original lubricating oil. It is an object of this invention to increase the viscosity and to improve the lubricating and other qualities of such inferior lubricating oils by addition thereto of such resins.

Resins suitable for this invention may be prepared in a great variety of ways; for example relatively pure olefines or mixtures of olefines and diolefines, such as amylene and isoprene, may be condensed to resins by addition of aluminum chloride or other suitable halide polymerizing agent, as described in German Patent 278,486 to Schering. Cracked naphthas such as the condensates or oil gas drips boiling below 200° F. obtained in the gasification of gas oil may be treated with a small amount of aluminum chloride as described in U. S. Patent 811,563 to Ihart. The mixture is filtered and a resin obtained from the filtrate as a residue by distillation or evaporation of volatile constituents. As another example a resin may be prepared by contacting a cracked naphtha boiling from 60 to 150° C. with anhydrous zinc chloride as described in British Patent 3,572 of 1914. By still another method the liquid fraction obtained in cracking petroleum oil in vapor phase at 650° C. may be polymerized to a hard resin by the application of heat without a catalyst as described in U. S. 1,703,950.

It is recognized that many types of polymerization and condensation products can be obtained from unsaturated hydrocarbons. Many such products are insoluble in practically all solvents and are obviously unsuited for the present invention. The polymerization and condensation products intended for use in this invention are those resins and resinous products of relatively high molecular weight, say above 800 to 1000, and including the range to 2,000, 5,000, 10,000 and even higher, which are soluble in benzol, and which preferably are brittle and readily friable solids which become plastic on heating. Such products are designated by the term resin as used in the claims.

It is recognized that the presence of a relatively smaller proportion of impurities, such as heavy oils, which may have been present in the initial materials or may be formed during the polymerization and condensation reaction, may so affect the physical properties of the crude product that it may be semi-solid, tacky, so toughened as not to be brittle or pulverizable, or otherwise modified. The crude product containing the resin may also be used for the purpose of this invention, provided the impurities are not present in sufficient quantities to offset the advantageous effect of the resin. However, it is generally preferable to use resins that are sufficiently pure to be brittle and pulverizable solids at room temperature. The resin may be purified by distillation of vaporizable oils, preferably in high vacuum, and may be separated from oils and asphaltic matter by suitable selective solvents, such as liquefied hydrocarbon gases, petroleum ether, naphthas, a mixture of benzol and acetone, and the like.

The above resins may be used to thicken and to improve the viscosity index and other lubricating characteristics of lubricating oils. This is illustrated in the following examples:

Example 1

A petroleum naphtha obtained by cracking gas oil in vapor phase, at high temperature and low pressure, is carefully fractionated by distillation. The fraction boiling below about 180° C. is agitated with about 20% by weight of anhydrous aluminum chloride which is added in small quantities during continuous and vigorous agitation and cooling to maintain the reagents at about room temperature and preferably below about 40° C., as described by Thomas and Carmody, J. Ind. & Eng. Chem. 24 (1932) p. 1125, and in U. S. Patent 1,836,629. The reaction mixture is then hydrolyzed, the sludge withdrawn and the resin obtained as a residue on distillation of the oil layer. A solution of 5% by weight of this resin is prepared with a Coastal lubricating oil. The characteristics of the original lubricating oil and the resulting blend are as follows:

| Saybolt viscosity: | Coastal oil | Blend |
|---|---|---|
| Seconds at 100° F | 360 | 543 |
| Seconds at 210° F | 50 | 58.5 |
| Viscosity index | 38 | 55 |

*Example 2*

A fraction boiling in the gasoline range, containing olefin and diolefin, and probably aromatic and substituted aromatic hydrocarbons, and produced by vapor phase cracking of a petroleum gas oil fraction at high temperatures and low pressures by the "Gyro" process, is cooled to −70° F. Boron fluoride is bubbled through this fraction for about one hour, with addition of carbon dioxide snow to maintain the temperature continuously at about −70° F. (It is desirable when using boron fluoride to work at low temperatures, such as 0° F. to −90° F.) A noticeable thickening of the mixture occurs. The mixture is then allowed to warm up to room temperature. Any boron fluoride present is hydrolyzed, and the gasoline hydrocarbons are removed by distillation. There is thus obtained a residue consisting of about equal portions of a resin and an oil, the total residue corresponding to 30% of the original gasoline. The oil is removed by distillation under a vacuum of about 5 mm. of mercury to a temperature of about 450° F., the resin being obtained as the residue. A 10% blend of this resin in the Coastal oil described in Example 1 gives the following inspection:

| Saybolt viscosity: | |
|---|---|
| Seconds at 100° F | 655 |
| Seconds at 210° F | 62.2 |
| V. I. | 52 |

Similar blends may be prepared with resins prepared by other methods as described above and with other types of lubricating oils. It has been found that these resins are soluble only with difficulty in high grade lubricating oils such as those of the Pennsylvania type. This invention is accordingly particularly suited for the improvement of inferior quality lubricating oils such as lubricating oils having a viscosity index from about 50 to 0, or lower. Such lubricating oils are obtained from asphaltic, naphthenic and aromatic base crudes such as Coastal and California, and may also be obtained from other mineral carbonaceous materials, as by the liquefaction or destructive distillation of coal, shale, and the like. Similar hydrocarbon oils may be prepared synthetically or by polymerization and condensation of lower molecular weight hydrocarbons. Of course, with resins of suitable solubility, blends of exceptionally high viscosity index may be prepared with high grade Pennsylvania type oils. The amount of the resin used in any particular lubricating composition will depend upon the solubility of the resin in the oil used and on the extent of improvement desired. Generally, with oils having a viscosity index of 0 to 50, improved lubricants are prepared with about 2 to 10% of the resin in the composition, although lower or higher concentrations such as ½% or 1% to 15% or 25% or more may be used, and will be found suitable with oils of unusually high or low viscosity and viscosity index.

The color, purity, solubility in petroleum solvents, and other qualities of these resins may be "modified" or improved by various methods, and the improved resins may also be used to prepare blends with lubricating oils as described above. The resins may be purified and improved by suitable refining methods such as clay treating, sulfuric acid treating, hydrogenation, and the like. The solubility of the resins in petroleum oils, especially in paraffin base oils, may be improved by alkylation with suitable alkyl radicals such as methyl, ethyl, etc. to octyl, decyl and higher including the alkyl groups of fatty acids and alcohols, and the liquid olefines obtained by cracking paraffin wax.

The resin may be used in oil blends together with pour point depressing agents, oxidation inhibitors, load bearing or "extreme pressure lubricant" agents, lead soaps, sulphur compounds, sulfurized oils, dyes and the like as will be understood.

This invention is not to be limited to any specific examples which have been presented herein solely for purpose of illustration, but only by the following claims in which it is desired to claim all novelty insofar as the prior art permits.

I claim:

1. Lubricant comprising a mineral oil and a normally solid thickener produced by the condensation of olefin and diolefin hydrocarbons.

2. Lubricant comprising a mineral oil and a normally solid thickener produced by the condensation of olefin and diolefin hydrocarbons in the presence of boron fluoride at a low temperature.

3. Method for improving the lubricating characteristics of lubricating oils of petroleum origin having a viscosity index below 50, which comprises dissolving therein about ½ to 25% of a resin prepared by treating a cracked naphtha with an active halide polymerizing agent under conditions adapted to produce condensation products of olefine and di-olefine hydrocarbons present in said cracked naphtha.

4. Method according to claim 3 in which the cracked naphtha boils below 180° C.

5. Method according to claim 3 in which the resin is prepared by treating a cracked naphtha boiling below 180° C. with anhydrous aluminum chloride at a temperature below about 40° C. and separating the resin from the resulting mixture.

PER K. FROLICH.